May 30, 1961 N. KRAMAROFF 2,986,224
LAWN EDGERS
Filed Dec. 8, 1958
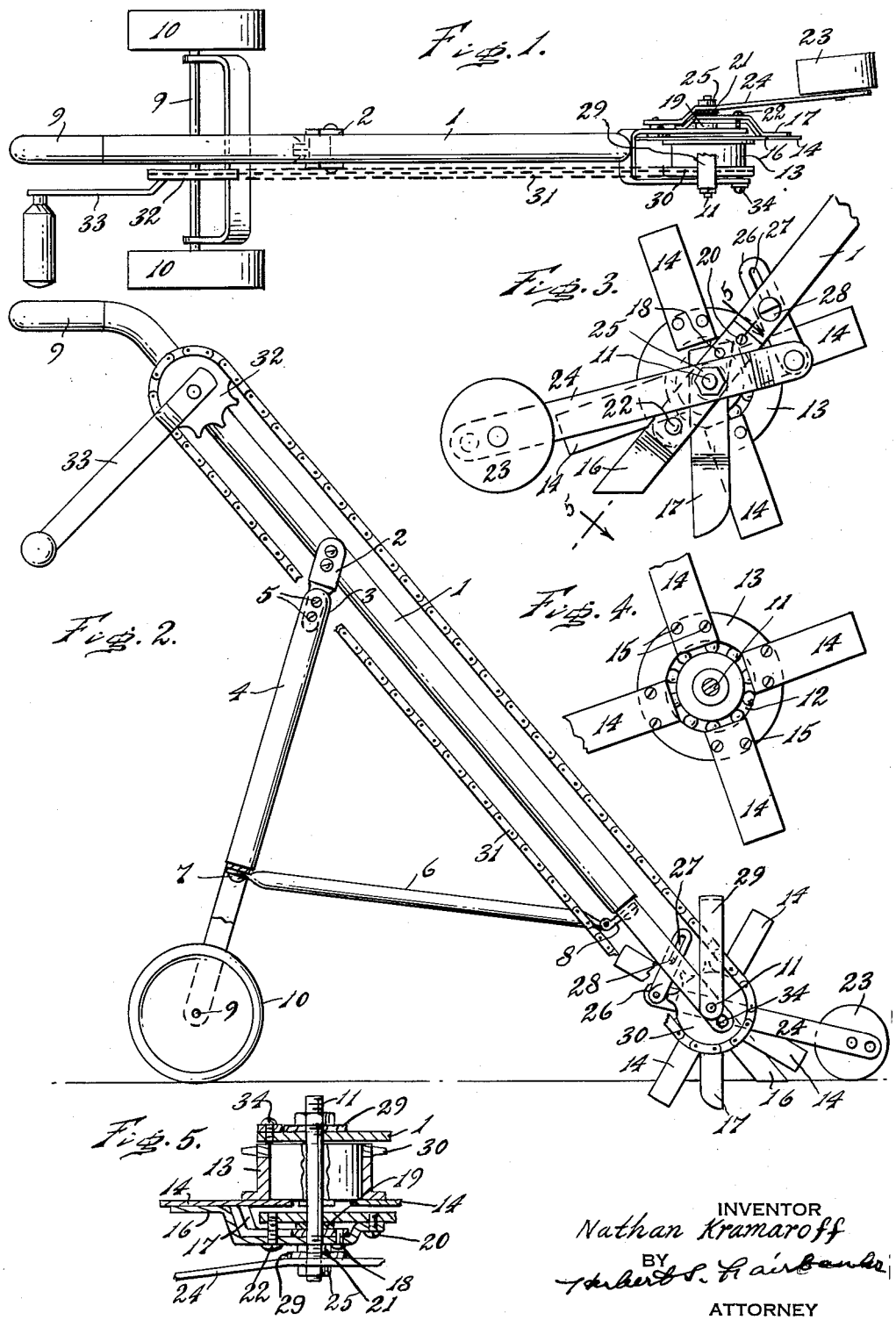
INVENTOR
Nathan Kramaroff
BY
ATTORNEY

2,986,224

LAWN EDGERS

Nathan Kramaroff, 7814 Mill Road, Elkins Park, Pa.

Filed Dec. 8, 1958, Ser. No. 778,657

1 Claim. (Cl. 172—16)

In the design and manufacture of lawn edgers, many factors must be taken into consideration, some of which are the following: must be designed for economical manufacture; it must provide sufficient power to operate the rotatable cutting blades; the weight should be distributed to retain the cutting mechanism in ground engagement; the blades should be protected when not in use; it should be of light weight and easily operated; and the frame should be foldable to reduce cost of packing and shipment.

The object, therefore, of this invention is to devise a novel lawn edger which will fulfill the foregoing requirements and which will be efficient in trimming and edging the grass along a sidewalk, driveway or other obstacle.

A further object is to devise a novel construction and arrangement of cutting mechanism.

A further object is to devise a novel foldable frame which will reduce the cost of packing and shipping.

A further object is to devise a novel protector for the cutting mechanism when the edger is not in use.

Other novel features and objects of the invention will hereinafter appear in the deailed description and the appended claims.

For the purpose of illustrating the invention, I have shown in the accompanying drawing a preferred embodiment of it which I have found in practice to give satisfactory and reliable results. It is, however, to be understood that the various instrumentalities of which the invention consists can be variously arranged and organized and the invention is not limited, except by the scope of the appended claims, to the exact arrangement and organization of these instrumentalities as herein set forth.

Figure 1 is a top plan view of a lawn edger, embodying my invention.

Figure 2 is a side elevation.

Figure 3 is a side elevation on an enlarged scale of cutting mechanism and certain of its adjuncts.

Figure 4 is a side elevation of the rotatable cutter and its mounting with its supporting shaft in section.

Figure 5 is a section on line 5—5 of Figure 3.

Similar numerals of reference indicate corresponding parts.

Referring to the drawings:

The lawn edger has a triangular frame having a handle bar 1 the upper end of which is deflected rearwardly to form a grasping handle and the bar at its lower end terminates in a fork. A U-shaped bracket 2 is fixed to the upper portion of the bar 1 by welding or other suitable means and has depending spaced flanges 3 between which the upper, flattened end of a tubular link 4 extends and is secured thereto by fastening devices 5 such as the bolts and nuts shown. The lower end of the link 4 is secured to one end of a tubular link 6 by a pivot 7 and at its other end it is fixed to a hinge bracket 8 fixed in any desired manner to the handle bar 1. The link 4 is forked at its lower end to receive a shaft 9 on which wheels 10 are mounted. On removing one of the fastening devices 5 and pivot 7 the links can be folded towards the handle bar to make a smaller package for shipment.

A stationary shaft 11 is mounted in the handle bar fork, and an antifriction bearing 12 such as a ball or roller bearing is rotatable on the shaft 11. A blade carrier 13 is fixed to one side of the antifriction bearing and to this carrier circumferentially spaced blades 14 are secured by fastening devices 15 so that the blades can be replaced when worn out.

Stationary cutting blades 16 and 17 are employed to provide a plurality of cutting operations and each also serves as a guide blade to align the lawn edger along the side wall of a driveway or sidewalk. The blade 17 is mounted on the shaft 11, extends above the shaft and is fixed at its upper end to the blade 16 by a rivet 18. A spacer 19 is between an arm of the handle bar fork and the inner blade 17.

It will be apparent that the blades 16 and 17 may be made in one piece. The blades 16 and 17 below the shaft are inwardly deflected to bring their cutting edges into the same plane and in position to cooperate with the rotatable blades 14. The blade 16 has its upper end fixed to the handle bar fork by a fastening device 20. The blades 16 and 17 are retained on the shaft 11 by a nut 21 and such blades are tensioned by a set screw 22 passing through the outer blade 16 and engaging an arm of the handle bar fork.

The depth of cut is controlled by a roller 23 mounted at the front end of a lever 24 retained on the shaft 11 by a nut 25. The lever is deflected outwardly so that the roller has a tendency to move the blades 16 and 17 towards the line of the sidewalk or driveway. The height of the roller is adjusted by a link 26 having one end connected with the inner end of the lever 24, and the opposite end of the link has a slot 27 to receive a screw 28 engaging an arm of the handle bar fork.

In order to protect the blades when not in use, I preferably provide a U-shaped guard 29 with the ends mounted on the shaft 11 so that the guard can be swung downwardly below the blades to prevent ground contact.

The bearing 12 has fixed to it a sprocket 30 around which a chain 31 passes, said chain also passing around a sprocket 32 rotatably mounted at the upper end portion of the handle bar and having an actuating handle 33.

A screw 34 maintains the bearing 12 in proper position between the arms of the fork, the screw being threaded into an arm of the fork and bearing against a side of the bearing.

In the operation of the lawn edger, the operator revolves the upper sprocket to drive the chain and thereby the bearing which carries the rotatable blades 14.

The blades 16 and 17 have circumferentially spaced cutting portions or edges in the same vertical plane to co-operate with the rotatable blades.

Having thus described my invention, what I claim as new and desire to secure by Letters Patent is:

A lawn edger, comprising a frame having its lower end terminating in a fork, wheels mounted at the lower rear end of the frame, a stationary shaft in said fork, an antifriction bearing rotatable on said shaft, cutting blades fixed to said bearing, a stationary cutting blade on said shaft, a guide blade on the shaft having a portion below the shaft in longitudinal alignment with the lower portion of the stationary blade, the upper end of the stationary blade being fixed to the guide blade and the upper end of the guide blade being fixed to said fork, an adjustable depth gage roller carried by said shaft, a sprocket secured to said bearing, a sprocket mounted on the upper portion of the frame, a manually driven connection between said sprockets, and a U-shaped guard mounted on the shaft to be swung downwardly beneath the cutting blades to protect them from ground engagement.

References Cited in the file of this patent

UNITED STATES PATENTS

| | | |
|---|---|---|
| 537,447 | Galland et al. | Apr. 16, 1895 |
| 717,030 | Sager | Dec. 30, 1902 |
| 1,676,088 | Holmes | July 3, 1928 |
| 1,883,817 | Olsen et al. | Oct. 18, 1932 |
| 1,911,278 | Hines | May 30, 1933 |
| 2,478,813 | Esleck | Aug. 9, 1949 |
| 2,660,854 | Chadwick | Dec. 1, 1953 |
| 2,706,941 | Swanson | Apr. 26, 1955 |

FOREIGN PATENTS

| | | |
|---|---|---|
| 3,759 | Great Britain | Mar. 18, 1880 |